United States Patent
Ravindra

(10) Patent No.: US 12,315,004 B2
(45) Date of Patent: May 27, 2025

(54) INTEGRATING A PRODUCT MODEL INTO A USER SUPPLIED IMAGE

(71) Applicant: eBay Inc., San Jose, CA (US)

(72) Inventor: Shreyas Ravindra, Beaverton, OR (US)

(73) Assignee: eBay Inc., San Jose, CA (US)

( * ) Notice: Subject to any disclaimer, the term of this patent is extended or adjusted under 35 U.S.C. 154(b) by 92 days.

(21) Appl. No.: 18/098,045

(22) Filed: Jan. 17, 2023

(65) Prior Publication Data

US 2023/0153897 A1 May 18, 2023

Related U.S. Application Data

(63) Continuation of application No. 14/580,281, filed on Dec. 23, 2014, now Pat. No. 11,587,155.

(51) Int. Cl.
| | |
|---|---|
| *G06Q 30/0601* | (2023.01) |
| *G06F 3/04815* | (2022.01) |
| *G06F 3/04845* | (2022.01) |
| *G06T 19/20* | (2011.01) |

(52) U.S. Cl.
CPC ..... *G06Q 30/0643* (2013.01); *G06F 3/04815* (2013.01); *G06F 3/04845* (2013.01); *G06Q 30/0627* (2013.01); *G06T 19/20* (2013.01); *G06T 2210/41* (2013.01); *G06T 2219/021* (2013.01)

(58) Field of Classification Search
None
See application file for complete search history.

(56) References Cited

U.S. PATENT DOCUMENTS

| | | |
|---|---|---|
| 6,618,709 B1 | 9/2003 | Sneeringer |
| 9,734,634 B1 * | 8/2017 | Mott ................. G06F 3/002 |
| 9,875,496 B2 | 1/2018 | Zamer |
| 10,115,248 B2 | 10/2018 | Bhardwaj et al. |
| 2002/0093538 A1 | 7/2002 | Carlin |
| 2003/0179218 A1 | 9/2003 | Martins |
| 2006/0012611 A1 | 1/2006 | Dujmich |

(Continued)

OTHER PUBLICATIONS

J. K. T. Tang, W.-M. Lau, K.-K. Chan and K.-H. To, "AR interior designer: Automatic furniture arrangement using spatial and functional relationships," 2014 International Conference on Virtual Systems & Multimedia (VSMM), Hong Kong, China, 2014, pp. 345-352, doi: 10.1109/VSMM.2014.7136652. (Year: 2014).*

(Continued)

*Primary Examiner* — Michelle T Kringen
(74) *Attorney, Agent, or Firm* — FIG. 1 Patents

(57) ABSTRACT

Techniques for integrating a product model into a user supplied image are presented herein. A method is disclosed that includes receiving an image of a user space from a user, receiving one or more definitions that describe the user space, retrieving, based on search terms provided by the user, one or more items available at a networked marketplace that fit within the definitions of the user space, and generating a composite image by overlaying an image of one of the items on the image of the user space. The method further scales the image of the item according to the definition of the user space and the physical dimensions of the item, and depicts virtual guidelines indicating a current scale of the image of the item.

20 Claims, 12 Drawing Sheets

(56) References Cited

U.S. PATENT DOCUMENTS

| | | | |
|---|---|---|---|
| 2011/0029401 A1 | 2/2011 | Granger et al. | |
| 2011/0134108 A1 | 6/2011 | Hertenstein | |
| 2012/0183204 A1* | 7/2012 | Aarts | G06T 15/205 382/154 |
| 2014/0085333 A1 | 3/2014 | Pugazhendhi et al. | |
| 2014/0143254 A1* | 5/2014 | Datta | G06F 16/9535 707/E17.089 |
| 2014/0282060 A1 | 9/2014 | Bhardwaj et al. | |
| 2015/0120503 A1 | 4/2015 | Zamer | |
| 2015/0262421 A1 | 9/2015 | Bell et al. | |
| 2016/0198146 A1* | 7/2016 | Hayasaka | G06T 1/20 348/48 |

OTHER PUBLICATIONS

U.S. Appl. No. 14/580,281, "Final Office Action Received for U.S. Appl. No. 14/580,281, mailed on May 26, 2022", May 26, 2022, 22 pages.

U.S. Appl. No. 14/580,281, "Final Office Action Received for U.S. Appl. No. 14/580,281, mailed on Aug. 20, 2020", Aug. 20, 2020, 22 pages.

U.S. Appl. No. 14/580,281, "Non Final Office Action Received for U.S. Appl. No. 14/580,281, mailed on Feb. 3, 2021", Feb. 3, 2021, 26 pages.

U.S. Appl. No. 14/580,281, "Non Final Office Action Received for U.S. Appl. No. 14/580,281, mailed on Jan. 23, 2020", Jan. 23, 2020, 21 pages.

U.S. Appl. No. 14/580,281, "Non-Final Office Action received for U.S. Appl. No. 14/580,281, mailed on Jul. 10, 2019", Jul. 10, 2019, 19 pages.

U.S. Appl. No. 14/580,281, "Non-Final Office Action received for U.S. Appl. No. 14/580,281, mailed on Nov. 28, 2018", Nov. 28, 2018, 18 pages.

U.S. Appl. No. 14/580,281, "Non-final Office Action received for U.S. Appl. No. 14/580,281, mailed on Nov. 12, 2021", Nov. 12, 2021, 20 pages.

U.S. Appl. No. 14/580,281, "Notice of Allowability Received for U.S. Appl. No. 14/580,281, mailed on Nov. 9, 2022", Nov. 9, 2022, 9 pages.

U.S. Appl. No. 14/580,281, "Notice of Allowance Received for U.S. Appl. No. 14/580,281, mailed on Oct. 17, 2022", Oct. 17, 2022, 12 pages.

Liu, et al., "Smart shopper: an agent-based web-mining approach to Internet shopping", Apr. 2003, pp. 226-237.

* cited by examiner

INTEGRATING A PRODUCT MODEL INTO A USER SUPPLIED IMAGE

CROSS REFERENCE TO RELATED APPLICATIONS

This application is a continuation of U.S. patent application Ser. No. 14/580,281 by Ravindra, "Integrating a Product Model Into a User Supplied Image," filed Dec. 23, 2014, assigned to the assignee hereof, and expressly incorporated by reference herein.

TECHNICAL FIELD

The subject matter disclosed herein generally relates to the technical field of virtual marketplaces and more specifically to integrating a product model into a user supplied image.

BACKGROUND

As technology advances, more products are available for purchase electronically. Even large products, such as, refrigerators, couches, or other appliances can be purchased over a network. However, it may be difficult for a consumer to determine how such a large product will look in their home without temporarily putting the product in place. Physically testing the looks of a large or heavy item in a user space typically demands significant effort on the part of the consumer.

A consumer may not be willing to risk purchasing an expensive item without temporary placement. Also, a seller of expensive items may not be willing to allow a consumer to temporary place the item in the user space without purchase. To address this problem, some systems depict an image of the item overlaid on a background image; however, determining a correct scale of the product without user intervention is more challenging.

Furthermore, searching through lists of available products to determine whether the product will fit a given user space can be an arduous task. For example, when looking for a refrigerator, a user needs to examine each dimensions of potential purchase to determine whether the refrigerator fits within a user space.

In another scenario, purchasing a used product may make it difficult to determine accurate dimensions because an unsophisticated seller may not provide accurate dimensions.

BRIEF DESCRIPTION OF THE DRAWINGS

Some embodiments are illustrated by way of example and not limitation in the figures of the accompanying drawings.

DETAILED DESCRIPTION

The description that follows includes illustrative systems, methods, techniques, instruction sequences, and computing machine program products that embody illustrative embodiments. In the following description, for purposes of explanation, numerous specific details are set forth in order to provide an understanding of various embodiments of the inventive subject matter. It will be evident, however, to those skilled in the art that embodiments of the inventive subject matter may be practiced without these specific details. In general, well-known instruction instances, protocols, structures, and techniques have not been shown in detail.

Example systems and methods for integrating a product model into a user supplied image are disclosed. In order to address problems associated with determining how a large or heavy item will look in a user space, a system as disclosed herein, receives an image of a user space and a physical definition of the user space from the user. The system may then query a networked marketplace and restrict search results to items that physically fit within the defined user space.

The system may further generate a composite image by overlaying an image of the product into the user space. In order to ensure an accurate representation of the product, the system scales the image of the product according to the physical dimensions of the user space and the physical dimensions of the product. Additionally, the system may depict virtual guidelines for the image of the product to provide the user with accurate scaling information.

Figure 1:
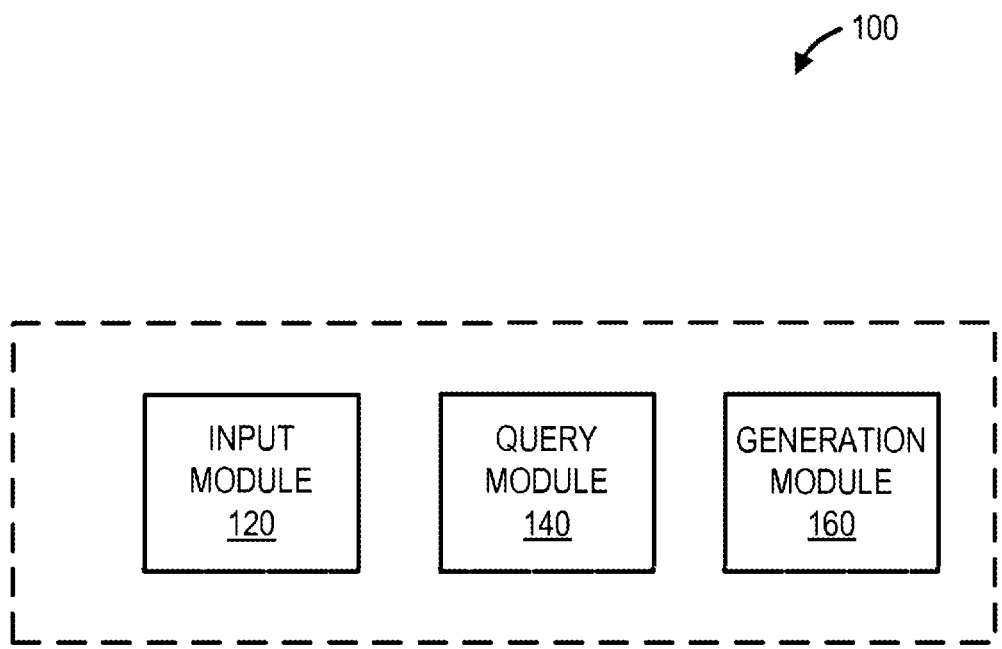
FIG. 1 is a block diagram illustrating a computing device for integrating a product model into a user supplied image, in accordance with an example embodiment.

FIG. 1 is a block diagram illustrating a computing device 100 for integrating a product model into a user supplied image, in accordance with an example embodiment. According to one example embodiment, the computing device 100 includes an input module 120, a query module 140, and a generation module 160. In some embodiments, the computing device 100 is a mobile computing device for the user. In other embodiments, the computing device 100 is a remote server as will be described in subsequent paragraphs.

In one example embodiment, the input module 120 is configured to receive an image of a user space. An image of a user space, as described herein, includes an image of a physical space where a product will be placed. In one example, a user may desire a new refrigerator and may remove an existing refrigerator. The user space is the physical location where the new refrigerator will be placed. In another example, a user may desire to purchase a couch. The user may take a picture of the location where the couch will be placed and the input module 120 receives this image of the user space (where the couch will be placed).

In one example embodiment where the input module 120 operates as part of a mobile computing device, the input module 120 receives the image of a user space from a camera included in the mobile computing device. In another example embodiment where the input module 120 operates as part of a remote server, the input module 120 receives the image of the user space from a user's mobile computing device.

In another example embodiment, the input module 120 receives a definition of the user space. A definition of the user space may include any set of values that define a physical area. The definition of the user space may include two-dimensional values or three dimensional values. Furthermore, the definition may include an offset from an edge of the user image. In this way, the definition may specifically identify an area of the user image and indicate a physical area of the definition. The input module 120 may receive the definition of the user space from input at a mobile computing device for the user as will be further described.

In one example, where the device 100 is a user's mobile computing device, the input module 120 interacts with the user to receive the definition of the user space via one or more input devices. In another example, where the device 100 operates as a server, the input module 120 may receive the definition from the user's mobile computing device.

In one example, the definition of the user space defines a two dimensional area on the image from the user. A user interface may be configured to allow a user to move and/or stretch a two dimensional shape to define the user space. For example, a user may select a square and may move the square to a position to define the user space. The user may also stretch and/or resize the square as desired. Furthermore, the input module 120 may receive physical measurements for the square such that the input module 120 may determine a physical area of the indicated user space.

In another example, the user may select a circle, ellipse, triangle, trapezoid, or any other polygon. Therefore, in certain example embodiments, the user may configure a set of vectors that define a polygon to indicate the user space.

In another example embodiment, the definition of the user space defines a three dimensional volume. The user interface may be configured to allow a user to move and/or stretch a three dimensional shape to define the user space. For example, the user may select a cube and may move and/or resize the cube to define the user space. Of course, other three dimensional shapes may be used and this disclosure is not limited in this regard.

In another example embodiment, the definition of the user space include three dimensions and less than three dimensions are hard limits. For example, an X axis and a Y axis may be hard limits. A hard limit, as described herein, includes a boundary to the user space that may not be exceeded. In this embodiment, at least one of the axis may not include a limit or boundary. For example, a Z axis in a three dimensional definition may not include a limit and the definition of the user space. Therefore, in one example, the user space may include a column of space with boundaries in an X and a Y direction, but no limits in a Z direction as one skilled in the art may appreciate.

In another example embodiment, the definition of the user space includes a soft limit for at least one of the boundaries. A soft limit, as described herein, may include a range of limits. For example, where the definition defines a two dimensional shape (e.g. a rectangle, or other 4 sided polygon), the definition may include a hard limit for one dimension (e.g. an X axis), and a soft limit for another dimensions (e.g. a Y axis). The definition may therefore include, a user space where the X dimension is a hard limit and cannot be exceeded, but the Y dimension includes a range of values. For example, the user space that is a rectangle may have a X limit of 32 inches, and a Y limit of 18 to 40 inches. Of course, other values may be used and this disclosure is not limited in this regard.

In one specific example, the user space may be for a refrigerator and the definition of the user space may include hard limits for a width and a depth, and a soft limit for the height. Therefore, only a refrigerator that fits the width and depth may fit the definition of the user space, however, the height of the refrigerator may be a range of heights, based at least in part on the availability of space above the user space.

In one example embodiment, the device 100 includes the query module 140. The query module 140 may be configured to receive search terms from the user and the retrieve one or more items that are available for purchase. The query module 140 may query a database of available items, a networked marketplace, a retail system, or any other supplier of goods and/or services. In one example embodiment, the query module 140 limits search results to products that fit within the definition of the user space.

In one example, the definition includes a square on the user image, and the query module 140 filters search results to item that would fit within the square as one skilled in the art may appreciate. In another example, the definition includes a circle and the query module 140 filters search results to items that would fit within the circle. Of course, this disclosure is not limited in this regard and the query module 140 may determine whether an item fits within the definition of the user space based on the dimensions of the user space and the physical dimensions of the product.

In one example embodiment, the query module 140 may consider two dimensions of the product. Although a product model may include three dimensions, the query module 140 may determine a smallest two dimensional plane that could contain any two dimensional plane of the product model. Therefore, the query module 140 may determine whether a three dimensional model would fit within a two-dimensional definition, regardless of a rotation of the product model.

In another example embodiment, the query module 140 may determine whether a product fits within a definition of the user space by determining whether a two dimensional view of the product model is substantially similar to a size of the definition of the user space. As described herein, substantially similar means that the size of the product is within a threshold percentage of the size of the user space.

In one example, where a threshold percentage is 5%, the product is 42 inches by 42 inches, and the definition of the user space is 41 inches by 41 inches. In this example, the area of the definition of the user space is 1764 square inches and the area of one view of the product is product is 1681. Because a percentage difference in area between 1764 and 1681 is less than 5%, the query module 140 may determine that a size of the product is substantially similar to the definition of the user space.

In another example embodiment, substantially similar may to one or more dimensions of the user space. For example, for a two dimensional definition of a user space, one dimension may include a hard limit, and the other dimension may be based on substantial similarity. For example, a X axis may include a hard limit with little to no variation acceptable, while the other Y axis may be substantially similar, or may tolerate a 4% variation, or the like. Of course, other values may be used and this disclosure is not limited in this regard.

In another example embodiment, the device 100 includes the generation module 160 configured to generate a composite image of the product model with the image of the user space. According to one embodiment, the generation module 160 overlays an image of the product on the image centered to fit within the user space.

Furthermore, the generation module 160 may scale the image of the product according to the definition of the user space and the physical dimensions of the item. The generation module 160 may determine a physical scale of the user image based on the location of the definition of the user space, and physical measurements of the definition of the user space.

For example, where the user space is 50 inches wide, and the product is 50 inches wide, the generation module 160 may modify a scale of the image of the product to be consistent with the width of the user space. In another example, where the user space is 50 inches wide, and the product is 40 inches wide, the generation module 160 may modify a scale of the image of the product to be 80% of the width of the user space. Therefore, using physical dimensions of the user space and the dimensions of the product, the generation module 160 may determine a physically correct scale for the product model.

In another example embodiment, the generation module 160 may adjust a rotation of the product model based on a rotation of the device 100. The device 100 may include sensors to determine an orientation of the system and the generation module 160 may adjust a rotation of the product model to match the orientation of the device 100.

The generation module 160 may depict the definition of the user space using different colors, patterns, line patterns, shaded areas, or the like. Therefore, a user viewing the composite image will be able to see differences between the user space and the product dimensions.

In another example embodiment, the generation module 160 may transmit the composite image to a remote device. The generation module 160 may transmit the composite image wirelessly, over a network, via a remote service, or other, or the like. Of course, one skilled in the art may appreciate many different ways to transmit an image and this disclosure is not limited in this regard.

Figure 2:
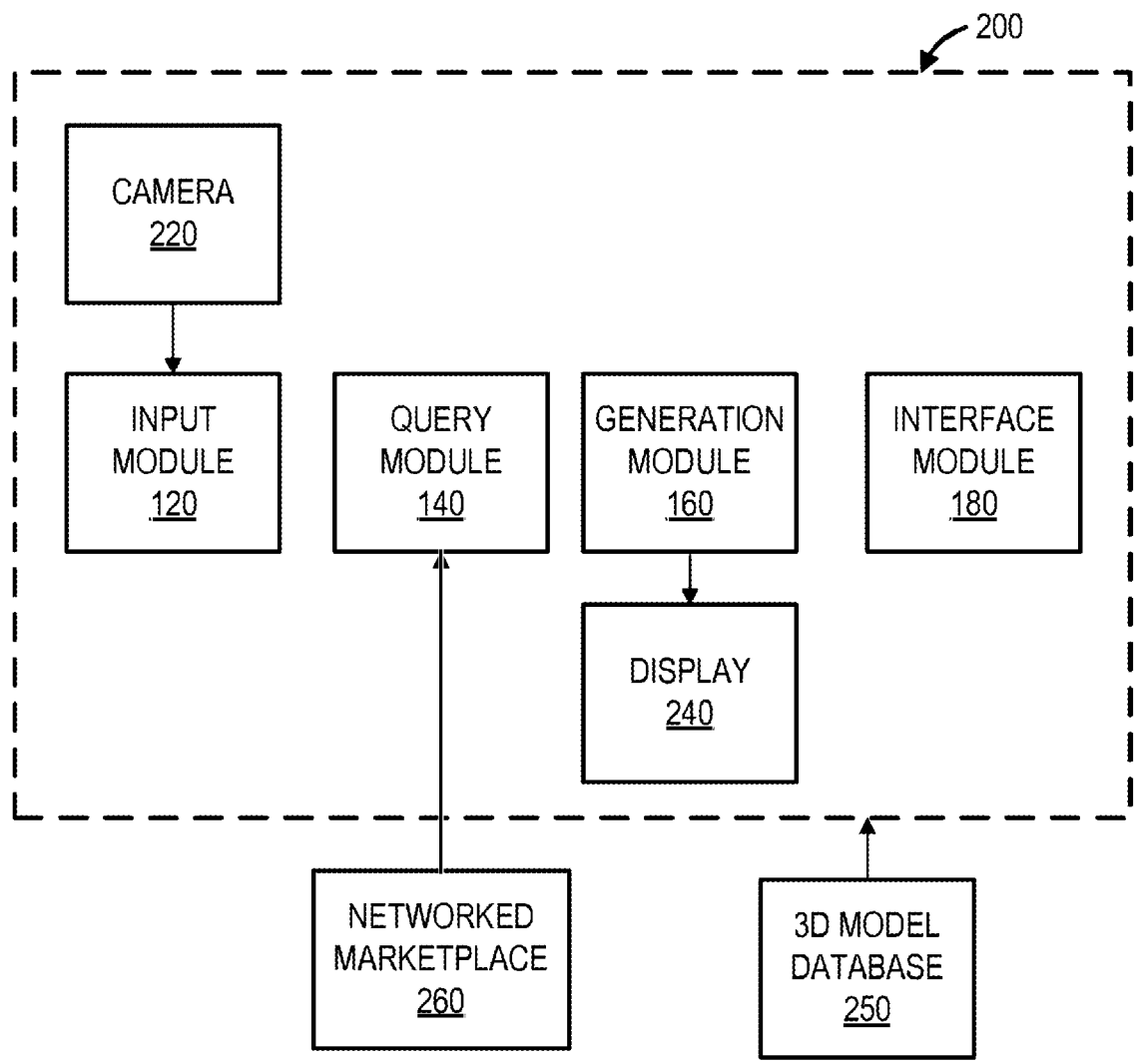
FIG. 2 is a block diagram illustrating a system for integrating a product model into a user supplied image in accordance with an example embodiment.

FIG. 2 is a block diagram illustrating a system 200 for integrating a product model into a user supplied image in accordance with an example embodiment. According to one example embodiment, the system 200 includes a camera 220, the input module 120, the query module 140, the generation module 160, an interface module 180, and a display 240. The input module 120, the query module 140, and the generation module 160 may or may not be substantially similar to those modules depicted in FIG. 1. The system 200 may communicate with a networked marketplace 260 as described herein, as well as a three-dimensional (3D) model database 250.

In one example embodiment, the input module 120 may receive the image of the user space from the camera 220. The camera 220 may include any image capturing device as one skilled in the art may appreciate. The camera 220 may be a video camera and the input module 120 may extract a single frame as the image of the user space. Also, the camera 220 may be a still shot camera and the input module 120 may receive the shot of the user space.

In another example embodiment, the interface module 180 may be configured to provide an interface to allow the user to manipulate the image of the product. As one skilled in the art may appreciate, the interface module 180 may provide controls to move the product image, scale the product image, rotate the product image, or modify the product image in some other way In one example embodiment, the interface module 180 may be configured to provide graphical user interface controls to allow a user to zoom in on the image of the product. In response to the user zooming in on the product, the generation module 160 may replace the image of the product with a higher resolution version. In one non-limiting example, in response to the user zooming in such that less than ½ of the image of the product is viewable by the user, the generation module 160 may load a higher resolution image of the product. Therefore, the user may zoom in to the product image and view details of the product based on the high resolution product image. Furthermore, the user may compare details of the product with features and/or aspects of the user image.

In another example embodiment, the query module 140 may communicate with a networked marketplace 260 to retrieve a list of products (based on search terms provided by the user) that fit within the definition of the user space. A networked marketplace, as described herein, includes a remote system for buying and/or selling products or services. At a networked marketplace, a seller may submit products and/or services to sell, and a buyer may purchase available products and/or services. Of course, one skilled in the art may recognize other configurations of a networked marketplace and this disclosure is not limited in this regard. In one example embodiment, the networked marketplace may receive one or more search terms and may return a list of available items.

In one example embodiment, in order to determine whether items received from the networked marketplace 260 fit within the user space, the query module 140 may request a 3D model from the 3D model database 250. For example, in response to the returned item not including a 3D model, the query module 140 may request a model based on a brand of the item, a model number of the item, or other identifying characteristic. Therefore, although a user may provide inaccurate dimensions for the item, the query module 140 may nonetheless determine accurate physical dimensions.

Figure 3:
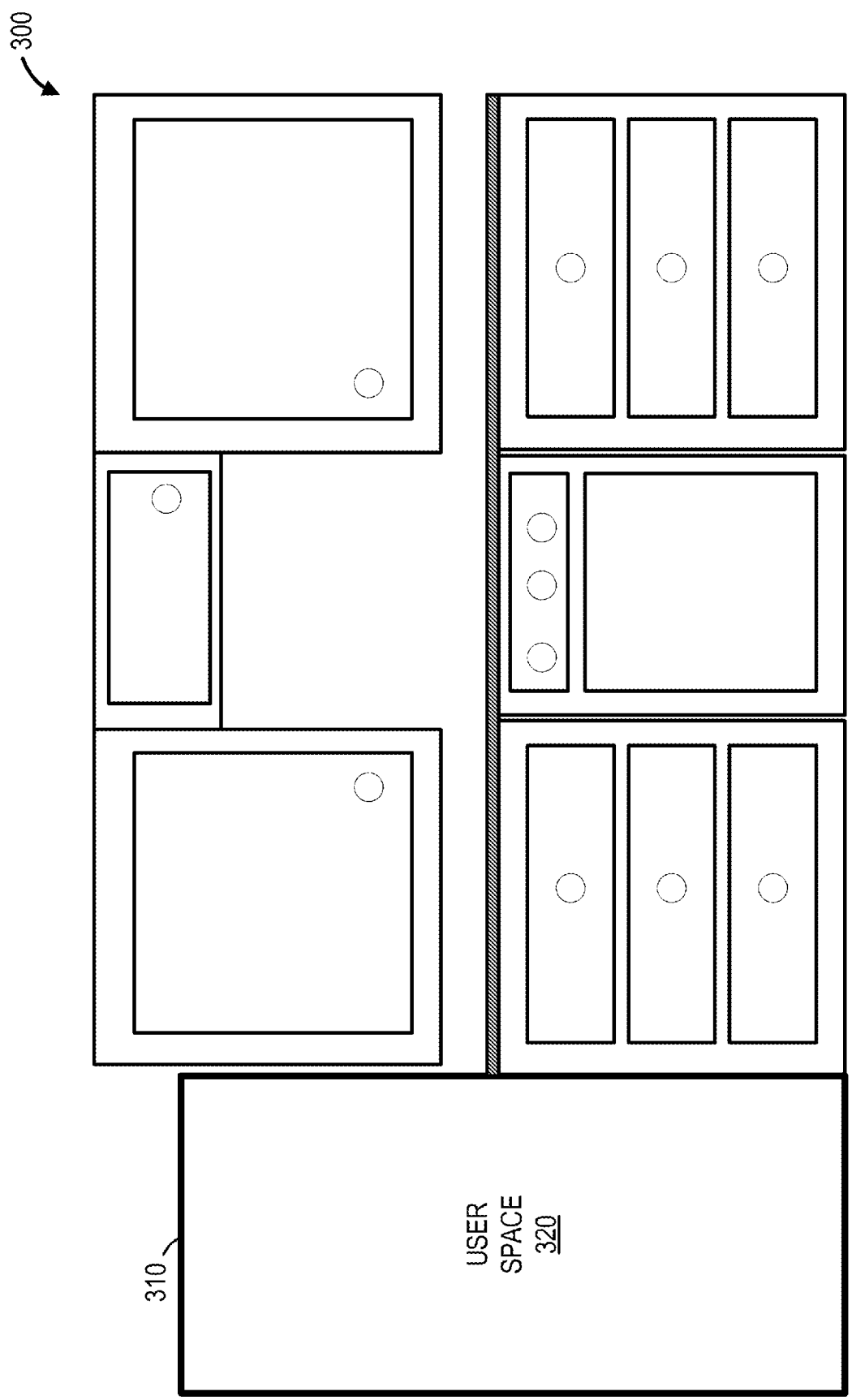
FIG. 3 is an illustration depicting a user supplied image in accordance with an example embodiment.

FIG. 3 is an illustration depicting a user supplied image 300 in accordance with an example embodiment. According to this example, the user may take a picture of a kitchen having removed the refrigerator. The user space 320 is the space where a new refrigerator will be placed.

A user may define the user space 320 by placing and adjusting a definition 310 using controls provided by the interface module 180. The definition may include any shape as one skilled in the art may appreciate. The user may move the definition 310 to enclose the user space 320. The generation module 160 may add the definition 310 to the composite image.

The query module 140 may receive one or more search terms from the user and may retrieve items that are available from a networked marketplace 260. According to this example, the query module 140 may search for a refrigerator and may limit search results to refrigerators that fit within the definition 310 of the user space 320.

In one example, the query module 140 may include dimensions of the user space 320 in the query to the networked marketplace 260 and the networked marketplace 260 may limit search results to refrigerators that fit within the user space 320. In another example, the query module 140 may not include dimensions of the user space 320 and the query module 140 may filter search results to restrict refrigerators to those that will fit within the user space 320.

In another example embodiment, the generation module 160 may generate, in response to a selection of one of the refrigerators, a composite image of the selected refrigerator in the user space 320. Based on the definition 310 of the user space 320 and the physical dimensions of the selected refrigerator, the generation module 160 may scale the image of the selected refrigerator so that the image of the selected refrigerator accurately represents the physical properties of the selected refrigerator.

Figure 4:
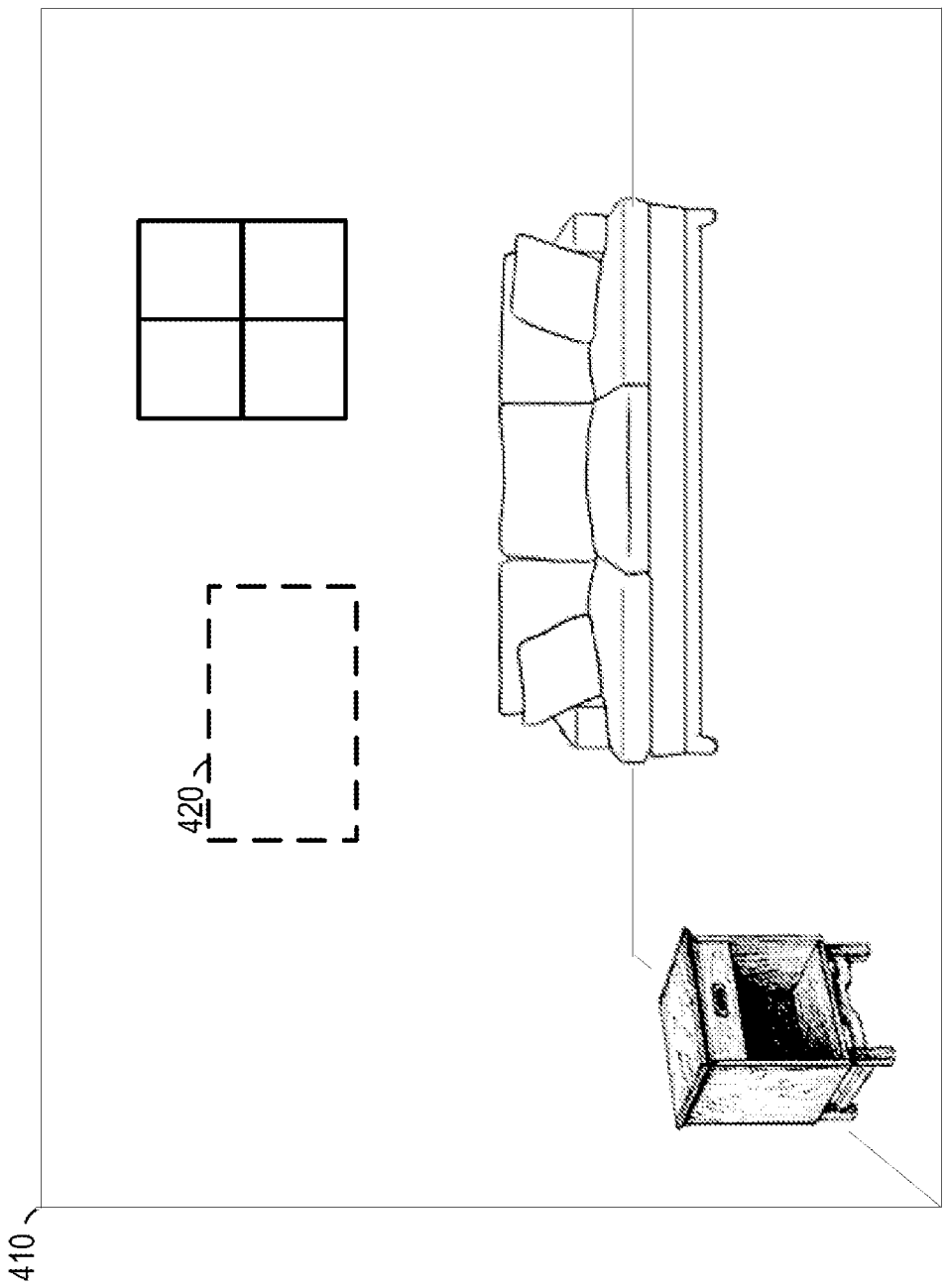
FIG. 4 is an illustration depicting a user supplied image in accordance with an example embodiment.

FIG. 4 is an illustration depicting a user supplied image 410 in accordance with an example embodiment. The user image 410 may include an image of a room in the user's home, or another location. As previously described, the user may provide a definition 420 of a user space.

In this specific example 400, the user space is an area on a wall of the room. The user may have selected a shape (e.g. a square) and using one or more controls provided by the interface module 180, may provide a definition 420 of the user space. The input module 120 receives the image from the user and receives the definition 420 of the user space.

The query module 140 may receive one or more search terms from the user and may retrieve items that are available from a networked marketplace 260. According to this example, the query module 140 may search for "art," "portrait", "painting," or other, or the like. The query module 140 may limit search results to items that fit within the definition 420 of the user space.

In one example, the query module 140 may include the definition 420 of the user space in the query to the networked marketplace 260 and the networked marketplace 260 may limit search results to items that fit within the definition 420. In another example, the query module 140 may not include the definition 420 of the user space and the query module 140 may filter search results to restrict results to those that will fit within the definition 420 of the user space.

Figure 5:
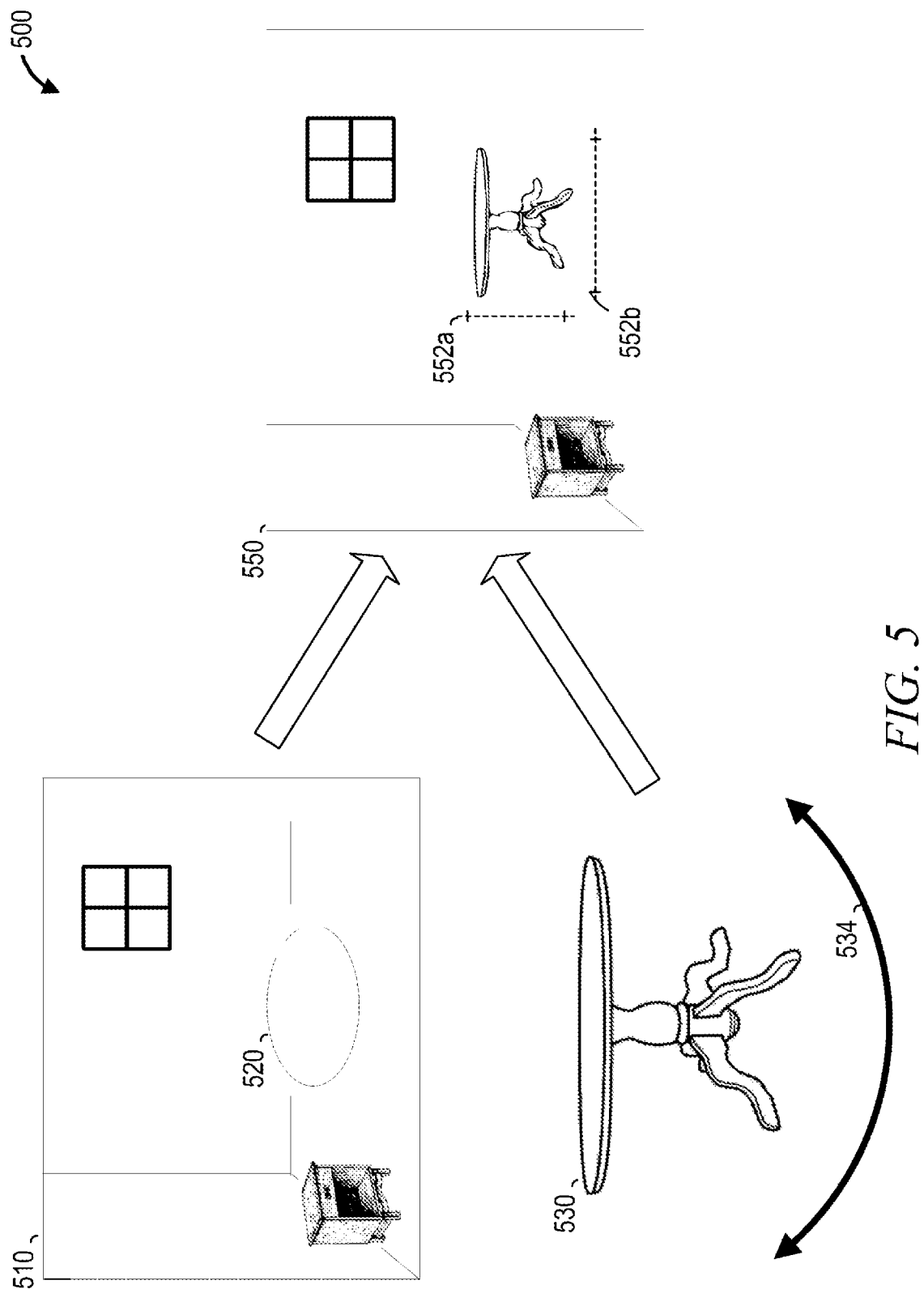
FIG. 5 is an illustration depicting a block diagram illustrating an example embodiment of the present disclosure.

FIG. 5 is an illustration depicting a block diagram illustrating an example embodiment of the present disclosure. In this example embodiment, the camera 220 may capture an image 510 of a user space. The input module 120 may receive a definition 520 that is an oval of the user space as previously described.

In one example embodiment, the query module 140 may receive search terms from the user including a "table." The query module 140 may query a networked marketplace 260 for tables. As previously described, the query module 140 may further include the definition 520. Based on results received from the networked marketplace 260, the query module 140 may retrieve a 3D model of each of the returned items.

In one example, the returned items include the table 530, and the query module 140 retrieves a 3D model of the table 530. The interface module 180 may present a control 534 for a user to rotate the table 530 until a desired orientation is achieved.

In another example embodiment, the generation module 160 may generate, in response to a selection of one of the items, a composite image 550 of the selected item in the user space 320. Based on the definition 520 of the user space 320 and the physical dimensions of the selected item determined by the 3D model of the table 530, the generation module 160 may scale the image of the selected item so that the image of the product accurately represents the physical dimensions of the selected item.

Furthermore, the interface module 180 may provide virtual guidelines 552 for the user. The virtual guidelines 552 indicate the scale determined by the generation module 160. Additionally, the virtual guidelines 552 may be manipulated by the user to alter the scale of the image of the product. In response to the user changing the scale of the product to be inconsistent with the determined scale, the interface module 180 may notify the user as one skilled in the art may appreciate.

In one example, the interface module 180 includes a vertical virtual guideline 552*a* for the user to adjust a vertical scale, and a horizontal virtual guideline 552*b* to adjust a horizontal scale of the image of the product. In another example, the user may translate the image deeper into the user image 510 and the generation module 160 may shrink a scale of the item of the product accordingly. In this example, because of manual changes by the user, the scale may not be consistent with the user space 520. However, the interface module 180 would notify the user of this fact. Therefore, the user may still check how the item may look in other locations in the user image 510. Of course, the interface module 180 may provide other virtual guidelines 552 and this disclosure is not limited in this regard.

Figure 6:
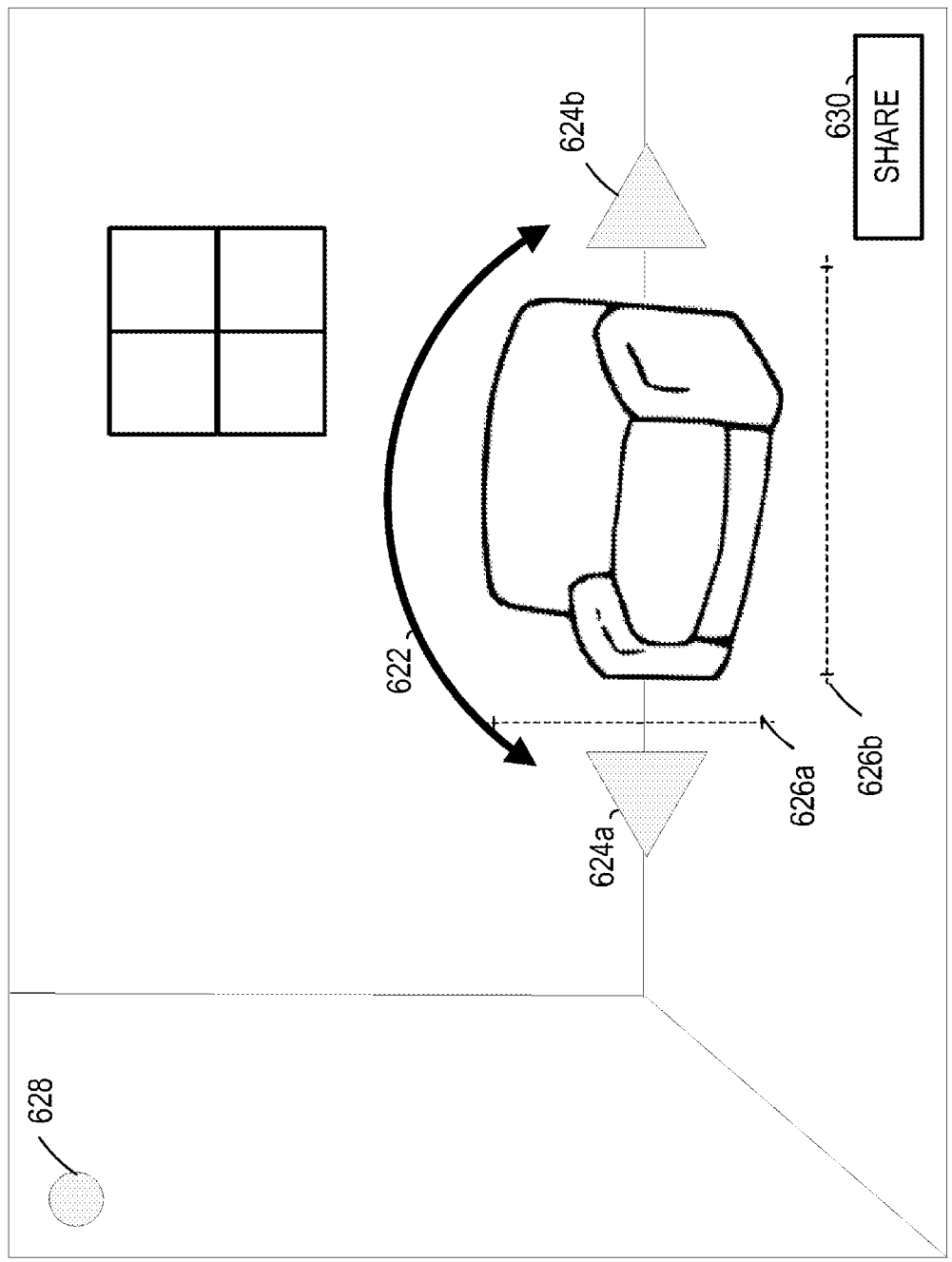
FIG. 6 is an illustration depicting a composite image in accordance with one example embodiment of the present disclosure.

FIG. 6 is an illustration depicting a composite image 600 in accordance with one example embodiment of the present disclosure. As previously described, the generation module 160 may generate the composite image 600 by overlaying an image of the product onto a user provided image of a user space.

Furthermore, the interface module 180 may provide one or more controls for the user to manipulate the image of the product. In one example, the user interface module 180 provides a rotation control 622 allowing a user to rotate the image of the product. The interface module 180 may also provide virtual guidelines 626 to indicate the determined scale of the image of the product. The interface module 180 may receive changes from the user using the virtual guidelines.

In another example embodiment, the interface module 180 may provide buttons 624 to receive a request to change the image of the product to a different item. For example, the query module 140 may return a list of items that may fit within the user space. In response to the user selecting button 624*a*, the generation module 160 may overlay the product image for an earlier item in the list of returned items. In response to the user selecting button 624*b*, the generation module 160 may overlay the product image for a later item in the list of returned items.

In one example embodiment, after the user manipulates a rotation and/or scale of the image of the product, the user may select button 624*a* or button 624*b*. In response, the generation module 160 may change the image of the product to a different item and may orient the different item according to an orientation of the initial item. Therefore, as a user changes a position and/or orientation of one item, the user may not need to repeat the changes. Therefore, the device 100 allows a user to quickly view many different items that are correctly scaled and oriented in a user supplied image and according to a definition of a user space in the user image.

In another example embodiment, the interface module 180 may provide a control 628 to change a light source. As one skilled in the art may appreciate, the image of the product may be based on a 3D model and shading and/or textures of the 3D model may change based on a light source. Therefore, as a user changes properties of the light source, the generation module 160 may update the image of the product accordingly. In certain examples, the properties of the light source include location, brightness, color, spread, or the like, as one skilled in the art may appreciate.

In another example embodiment, the interface module 180 may provide a button for the user to share the composite image 600 with another user. In response to the user pressing the button 630, the generation module 160 may save the composite image 600 to a user specified location, transmit the composite image 600 to another user, post the composite image 600 to a social media server, or to another location as one skilled in the art may appreciate.

Figure 7:
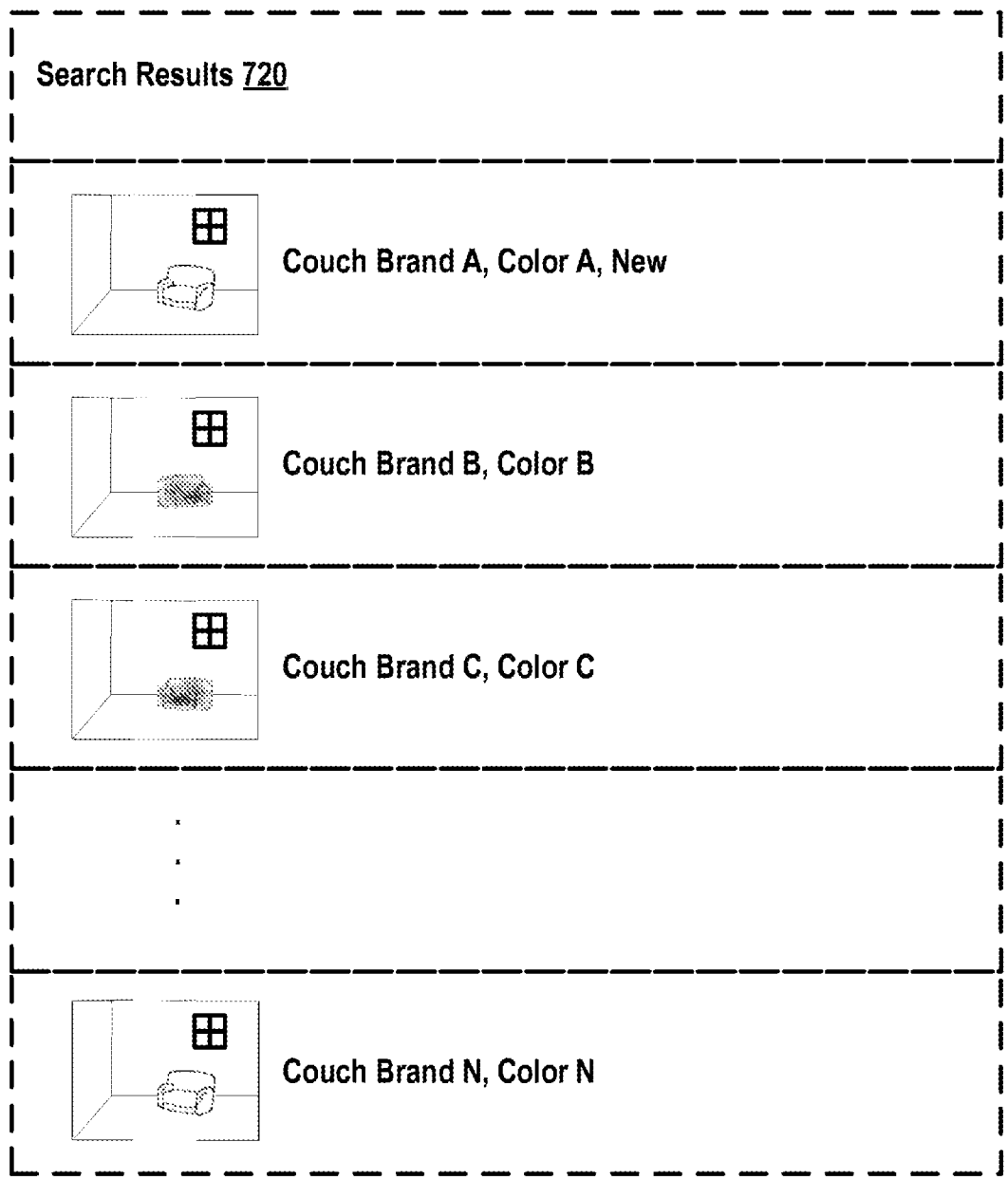
FIG. 7 is a block diagram illustrating search results in accordance with another example embodiment.

FIG. 7 is a block diagram illustrating search results 700 in accordance with another example embodiment. According to one example embodiment, the query module 140 may retrieve a list 720 of products and/or items that fit within a user definition of a user space.

In one example embodiment, the generation module 160 may generate respective composite images for each of the items returned in the list 720 of items. The composite images may be displayed in the list 720 of search results. Accordingly, a user may quickly see many items that fit within the user space and may quickly determine how the items look in the user space. Presenting a list 720 of items in this way allows a user to more quickly determine which product and/or item to purchase.

Figure 8:
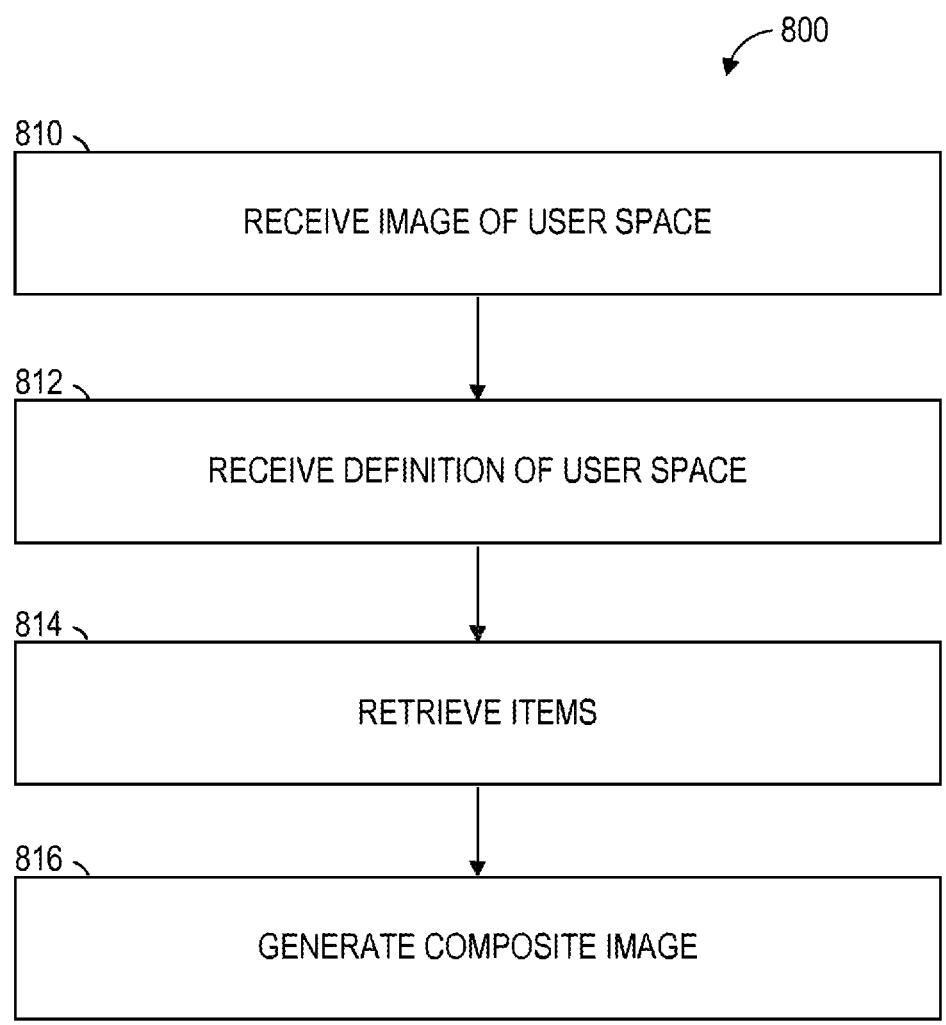
FIG. 8 is a flow diagram illustrating a method in accordance with an example embodiment.

FIG. 8 is a flow diagram illustrating a method 800 in accordance with an example embodiment. Operations in the method 800 may be performed by the device 100, using modules described above with respect to FIGS. 1 and 2. As shown in FIG. 8, the method 800 includes operations 810, 812, 814, and 816.

According to one example embodiment, the method 800 may begin and at operation 810 the input module 120 may receive an image of a user space from a user. The method 800 may continue at operation 812 and the input module 120 may receive a definition that describes the user space. The definition may include one or more vectors that describe a boundary of the user space, a shape that encloses the user space, or the like as one skilled in the art may appreciate.

The method 800 may continue at operation 814 and the query module 140 may retrieve, based on search terms provided by the user, one or more items available at a networked marketplace 260 that fit within the definition of the user space. The method may continue at operation 816 and the generation module 160 may generate a composite image by overlaying an image of one of the items on the image of the user space. The generation module 160 may scale the image of the item according to the definition of the user space and the physical dimensions of the item. Furthermore, the generation module 160 may depict virtual guidelines 626 indicating a current scale of the image of the item.

Figure 9:
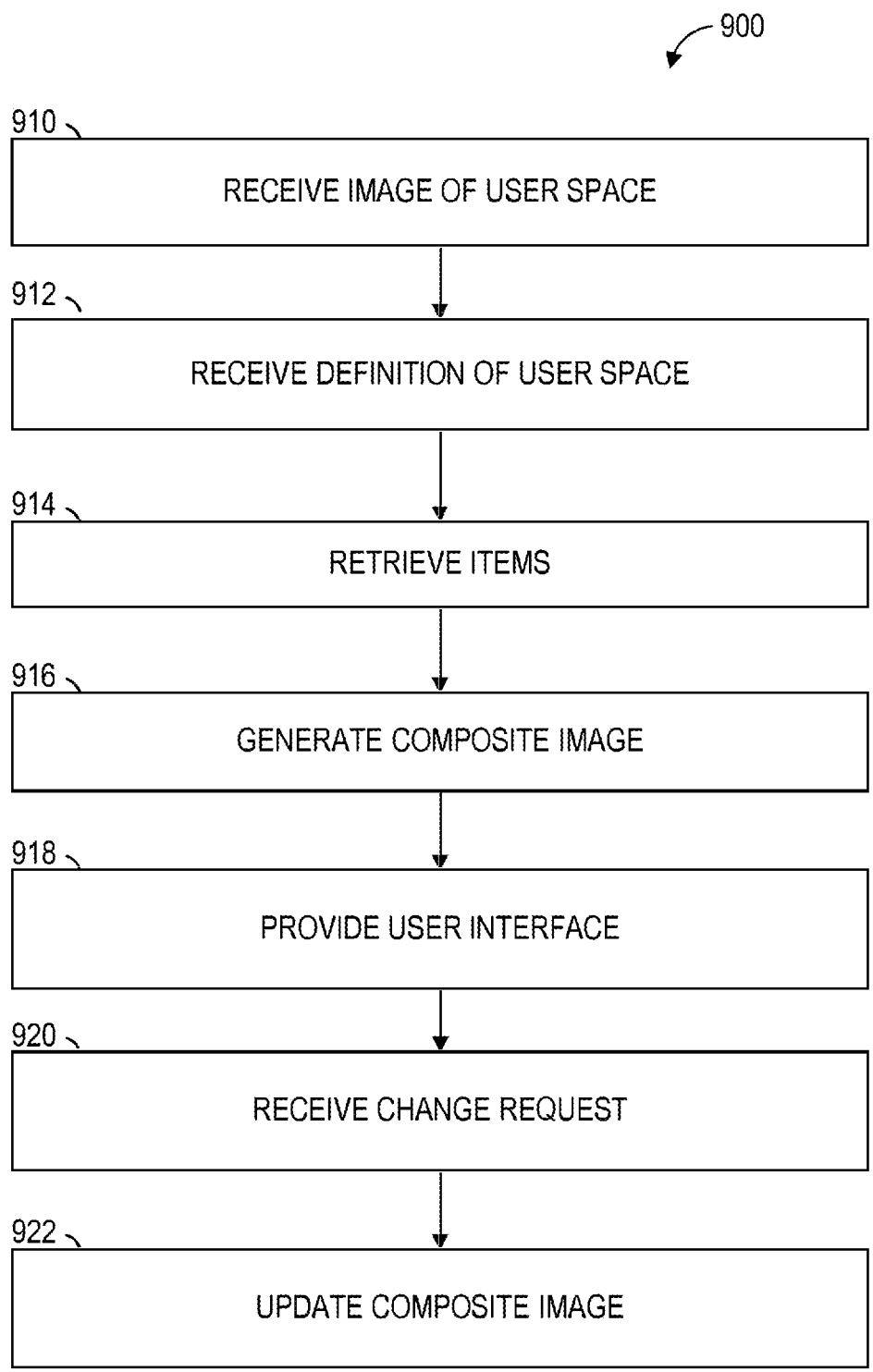
FIG. 9 is a flow diagram illustrating a method in accordance with an example embodiment.

FIG. 9 is a flow diagram illustrating a method 900 in accordance with an example embodiment. Operations in the method 900 may be performed by the device 100, using modules described above with respect to FIGS. 1 and 2. As shown in FIG. 9, the method 900 includes operations 910, 912, 914, 916, 918, 920, and 922.

According to one example embodiment, the method 900 may begin and at operation 910 the input module 120 may receive an image of a user space from a user. The method 900 may continue at operation 912 and the input module 120 may receive a definition that describes the user space as previously described. The method 900 may continue at operation 914 and the query module 140 may retrieve, based on search terms provided by the user, one or more items available at a networked marketplace that fit within the definition of the user space.

The method 900 may continue at operation 916 and the generation module 160 may generate a composite image by overlaying an image of one of the items on the image of the user space as described herein. The method 900 may continue at operation 918 and the interface module 180 may provide a user interface to allow a user to manipulate the image of the item by allowing the user to change a scale of the product image, a position of the product image, and/or an orientation of the product image.

The method 900 may continue at operation 920 and the interface module 180 may receive a request to change the product image. In one example, the change to the product image includes a change to a light source. In another example, the change to the product image includes changing the product to a different product. The method 900 may continue at operation 922 and the generation module 160 may update the composite image based on the change.

Figure 10:
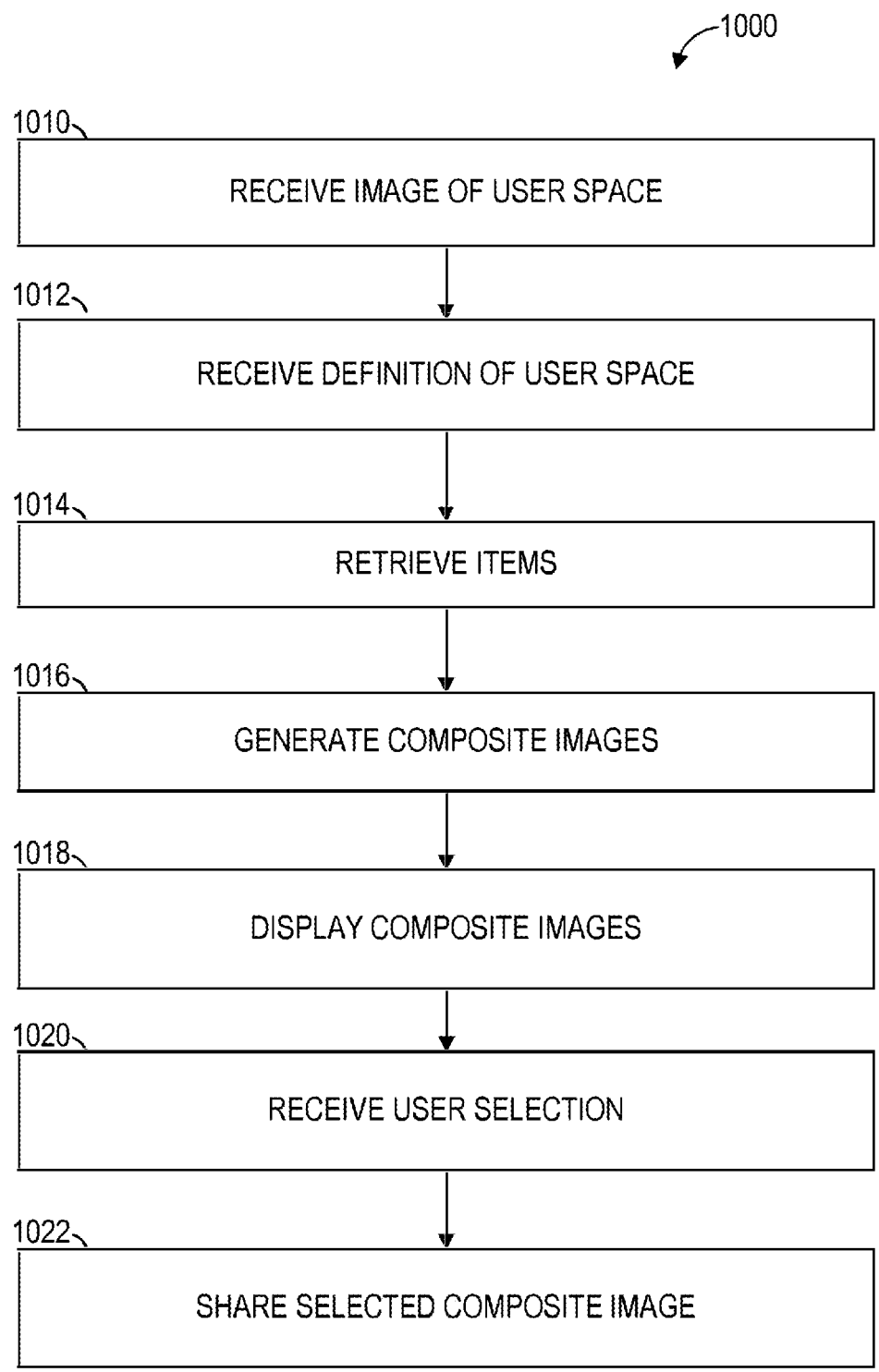
FIG. 10 is a flow diagram illustrating a method in accordance with an example embodiment.

FIG. 10 is a flow diagram illustrating a method in accordance with an example embodiment. Operations in the method 1000 may be performed by the device 100, using modules described above with respect to FIGS. 1 and 2. As shown in FIG. 10, the method 100 includes operations 1010, 1012, 1014, 1016, 1018, 1020, and 1022.

According to one example embodiment, the method 1000 may begin and at operation 1010 the input module 120 may receive an image of a user space from a user. The method 1000 may continue at operation 1012 and the input module 120 may receive a definition that describes the user space as previously described. The method 1000 may continue at operation 1014 and the query module 140 may retrieve, based on search terms provided by the user, one or more items available at a networked marketplace that fit within the definition of the user space.

The method 1000 may continue at operation 1016 and the generation module 160 may generate composite images for each of the available items. The method may continue at operation 1018 and the interface module 180 may display the composite images along with the available items in a list. The method 1000 may continue at operation 1020 and the user interface module 180 may receive a user selection of one of the available items in the list 720. The method 1000 may continue and at operation 1022, the generation module 160 may share the composite image for the selected item.

Figure 11:
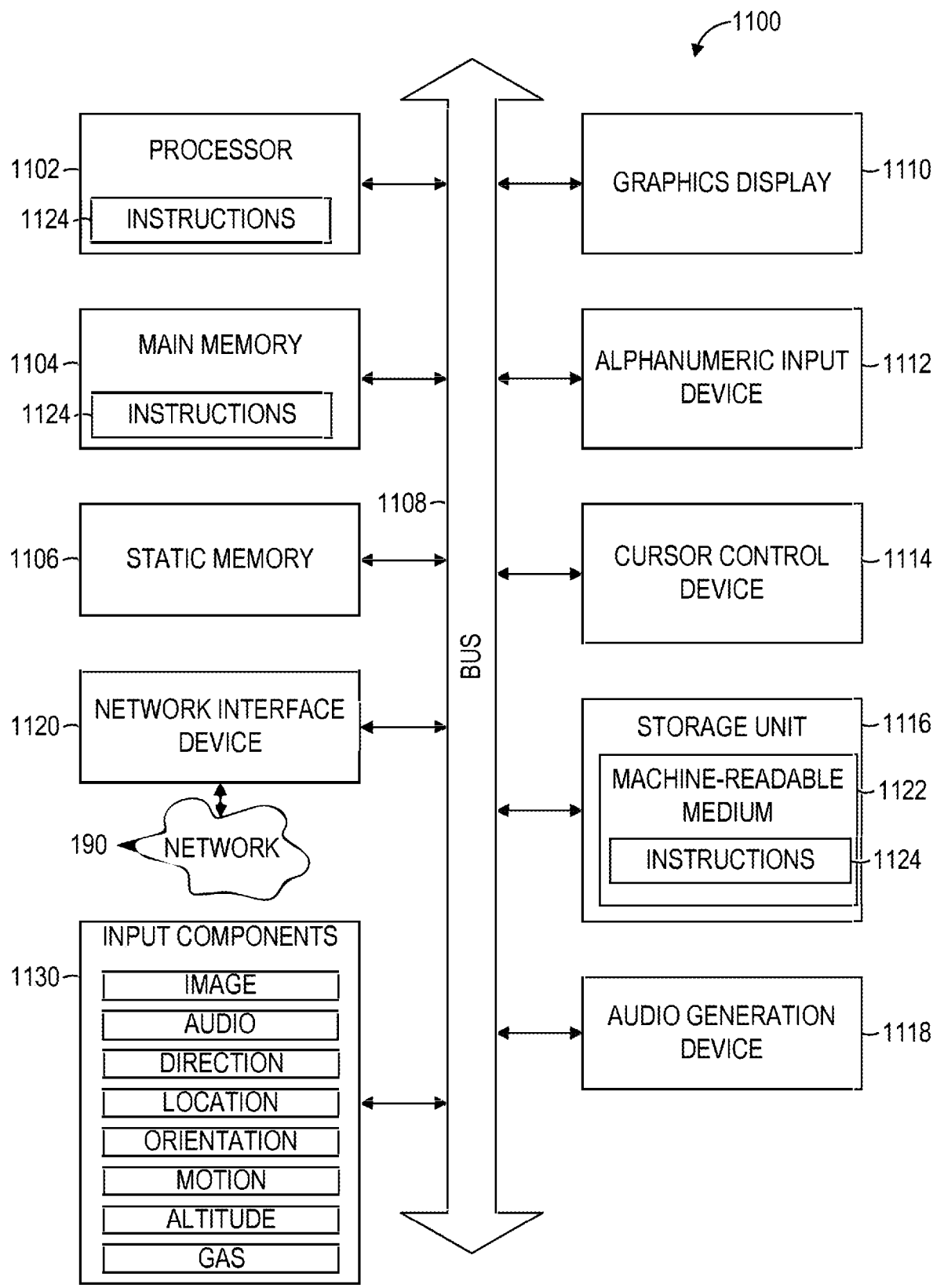
FIG. 11 is a block diagram illustrating components of a machine, according to some example embodiments, able to read instructions from a machine-readable medium and perform any one or more of the methodologies discussed herein.

FIG. 11 is a block diagram illustrating components of a machine 1100, according to some example embodiments, able to read instructions 1124 from a machine-readable medium 1122 (e.g., a non-transitory machine-readable medium, a machine-readable storage medium, a computer-readable storage medium, or any suitable combination thereof) and perform any one or more of the methodologies discussed herein, in whole or in part. Specifically, FIG. 11 shows the machine 1100 in the example form of a computer system (e.g., a computer) within which the instructions 1124 (e.g., software, a program, an application, an applet, an app, or other executable code) for causing the machine 1100 to perform any one or more of the methodologies discussed herein may be executed, in whole or in part.

In alternative embodiments, the machine 1100 may operate as a standalone device or may be connected (e.g., networked) to other machines. In a networked deployment, the machine 1100 may operate in the capacity of a server machine or a client machine in a server-client network environment, or as a peer machine in a distributed (e.g., peer-to-peer) network environment. The machine 1100 may be a server computer, a client computer, a personal computer (PC), a tablet computer, a laptop computer, a netbook, a cellular telephone, a smartphone, a set-top box (STB), a personal digital assistant (PDA), a web appliance, a network router, a network switch, a network bridge, or any machine capable of executing the instructions 1124, sequentially or otherwise, that specify actions to be taken by that machine. Further, while only a single machine is illustrated, the term "machine" shall also be taken to include any collection of machines that individually or jointly execute the instructions 1124 to perform all or part of any one or more of the methodologies discussed herein.

The machine 1100 includes a processor 1102 (e.g., a central processing unit (CPU), a graphics processing unit (GPU), a digital signal processor (DSP), an application specific integrated circuit (ASIC), a radio-frequency integrated circuit (RFIC), or any suitable combination thereof), a main memory 1104, and a static memory 1106, which are configured to communicate with each other via a bus 1108. The processor 1102 may contain microcircuits that are configurable, temporarily or permanently, by some or all of the instructions 1124 such that the processor 1102 is configurable to perform any one or more of the methodologies described herein, in whole or in part. For example, a set of one or more microcircuits of the processor 1102 may be configurable to execute one or more modules (e.g., software modules) described herein.

The machine 1100 may further include a graphics display 1110 (e.g., a plasma display panel (PDP), a light emitting diode (LED) display, a liquid crystal display (LCD), a projector, a cathode ray tube (CRT), or any other display capable of displaying graphics or video). The generation module 160 may display the composite image via the graphics display 1110. The machine 1100 may also include an alphanumeric input device 1112 (e.g., a keyboard or keypad), a cursor control device 1114 (e.g., a mouse, a touchpad, a trackball, a joystick, a motion sensor, an eye tracking device, or other pointing instrument), a storage unit 1116, an audio generation device 1118 (e.g., a sound card, an amplifier, a speaker, a headphone jack, or any suitable combination thereof), and a network interface device 1120. The interface module 180 may receive any of the user indication described herein via the alphanumeric input device 1112.

The storage unit 1116 includes the machine-readable medium 1122 (e.g., a tangible and non-transitory machine-readable storage medium) on which are stored the instructions 1124 embodying any one or more of the methodologies or functions described herein. The instructions 1124 may also reside, completely or at least partially, within the main memory 1104, within the processor 1102 (e.g., within the processor's cache memory), or both, before or during execution thereof by the machine 1100. Accordingly, the main memory 1104 and the processor 1102 may be considered machine-readable media (e.g., tangible and non-transitory machine-readable media). The instructions 1124 may be transmitted or received over the network 190 via the network interface device 1120. For example, the network interface device 1120 may communicate the instructions 1124 using any one or more transfer protocols (e.g., hypertext transfer protocol (HTTP)). In certain embodiments, the input module 120 may receive a user image through the network interface device 1120. In another embodiment, the query module 140 may query a remote 3D model database 250 over the network 190.

In some example embodiments, the machine 1100 may be a portable computing device, such as a smart phone or tablet computer, and have one or more additional input components 1130 (e.g., sensors or gauges). Examples of such input components 1130 include an image input component (e.g., one or more cameras), an audio input component (e.g., a microphone), a direction input component (e.g., a compass), a location input component (e.g., a global positioning system (GPS) receiver), an orientation component (e.g., a gyroscope), a motion detection component (e.g., one or more accelerometers), an altitude detection component (e.g., an altimeter), and a gas detection component (e.g., a gas sensor). Inputs harvested by any one or more of these input components may be accessible and available for use by any of the modules described herein.

Figure 12:
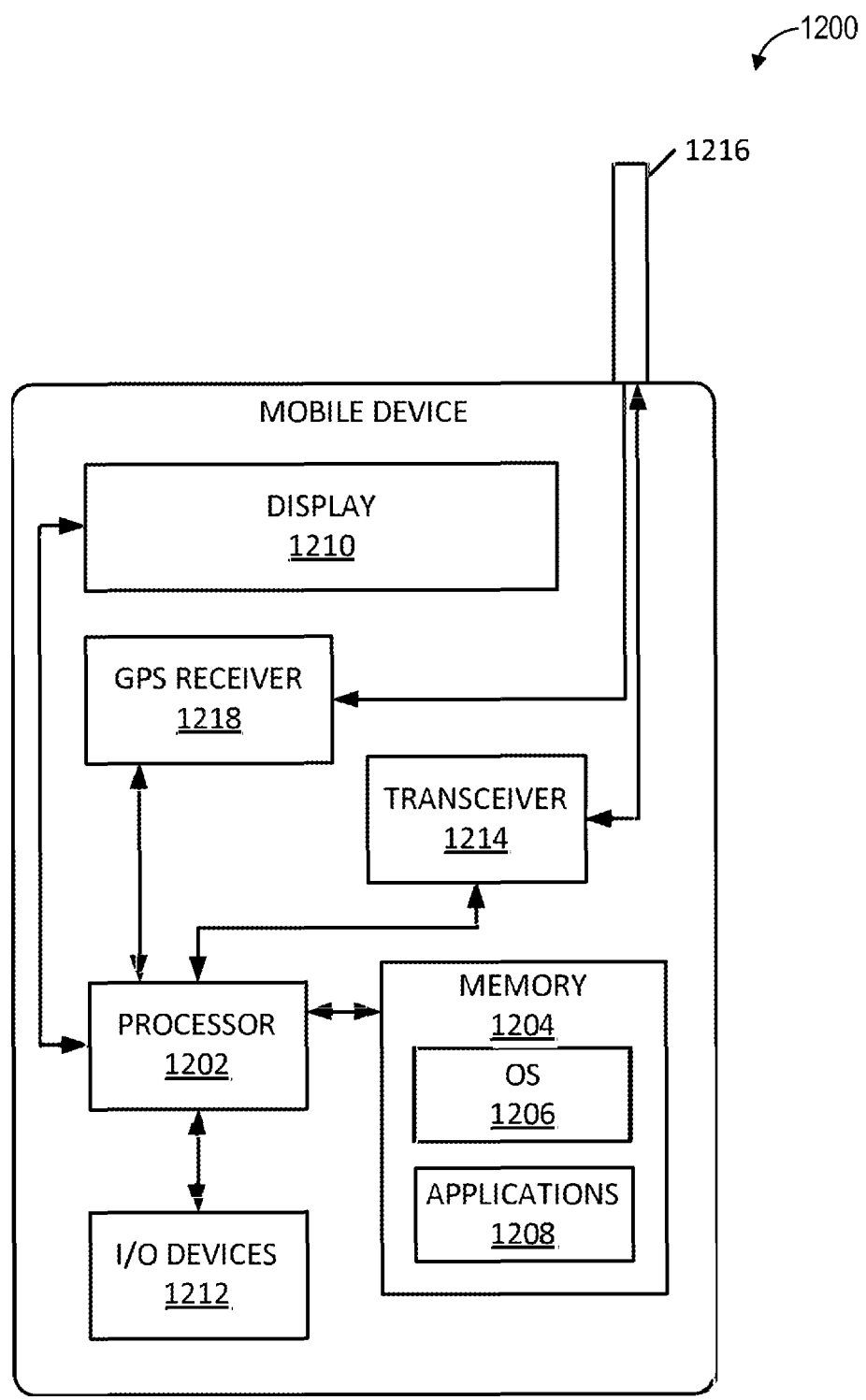
FIG. 12 is a block diagram illustrating components of a mobile device, according to some example embodiments.

FIG. 12 is a block diagram illustrating components of a mobile device, according to some example embodiments. The mobile device 1200 may include a processor 1202. The processor 1202 may be any of a variety of different types of commercially available processors suitable for mobile devices (for example, an XScale architecture microprocessor, a microprocessor without interlocked pipeline stages (MIPS) architecture processor, or another type of processor 1202). A memory 1204, such as a random access memory (RAM), a flash memory, or other type of memory, is typically accessible to the processor 1202. The memory 1204 may be adapted to store an operating system (OS) 1206, as well as applications 1208, such as a mobile location-enabled application that may provide location-based services (LBSs) to a user. The processor 1202 may be coupled, either directly or via appropriate intermediary hardware, to a display 1210 and to one or more input/output (I/O) devices 1212, such as a keypad, a touch panel sensor, a microphone, and the like. Similarly, in some embodiments, the processor 1202 may be coupled to a transceiver 1214 that interfaces with an antenna 1216. The transceiver 1214 may be configured to both transmit and receive cellular network signals, wireless data signals, or other types of signals via the antenna 1216, depending on the nature of the mobile device 1200. Further, in some configurations, a GPS receiver 1218 may also make use of the antenna 1216 to receive GPS signals.

In one embodiment, the device 100 may be embodied in a mobile device as described herein. In one example, a mobile device may include a camera 220, a display 240, the input module 120, the query module 140, and the generation module 160. In one example, a consumer may hold the mobile device in a position such that the camera 220 may capture an image of a user space.

As used herein, the term "memory" refers to a machine-readable medium able to store data temporarily or permanently and may be taken to include, but not be limited to, random-access memory (RAM), read-only memory (ROM), buffer memory, flash memory, and cache memory. While the machine-readable medium 1122 is shown in an example embodiment to be a single medium, the term "machine-readable medium" should be taken to include a single medium or multiple media (e.g., a centralized or distributed database, or associated caches and servers) able to store instructions. The term "machine-readable medium" shall also be taken to include any medium, or combination of multiple media, that is capable of storing the instructions 1124 for execution by the machine 1100, such that the instructions 1124, when executed by one or more processors of the machine 1100 (e.g., processor 1102), cause the machine 1100 to perform any one or more of the methodologies described herein, in whole or in part. Accordingly, a "machine-readable medium" refers to a single storage apparatus or device, as well as cloud-based storage systems or storage networks that include multiple storage apparatus or devices. The term "machine-readable medium" shall accordingly be taken to include, but not be limited to, one or more tangible (e.g., non-transitory) data repositories in the form of a solid-state memory, an optical medium, a magnetic medium, or any suitable combination thereof.

Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein.

Certain embodiments are described herein as including logic or a number of components, modules, or mechanisms. Modules may constitute software modules (e.g., code stored or otherwise embodied on a machine-readable medium or in a transmission medium), hardware modules, or any suitable combination thereof. A "hardware module" is a tangible (e.g., non-transitory) unit capable of performing certain operations and may be configured or arranged in a certain physical manner. In various example embodiments, one or more computer systems (e.g., a standalone computer system, a client computer system, or a server computer system) or one or more hardware modules of a computer system (e.g., a processor or a group of processors) may be configured by software (e.g., an application or application portion) as a hardware module that operates to perform certain operations as described herein.

In some embodiments, a hardware module may be implemented mechanically, electronically, or any suitable combination thereof. For example, a hardware module may include dedicated circuitry or logic that is permanently configured to perform certain operations. For example, a hardware module may be a special-purpose processor, such as a field programmable gate array (FPGA) or an ASIC. A hardware module may also include programmable logic or circuitry that is temporarily configured by software to perform certain operations. For example, a hardware module may include software encompassed within a general-purpose processor or other programmable processor. It will be appreciated that the decision to implement a hardware module mechanically, in dedicated and permanently configured circuitry, or in temporarily configured circuitry (e.g., configured by software) may be driven by cost and time considerations.

Accordingly, the phrase "hardware module" should be understood to encompass a tangible entity, and such a tangible entity may be physically constructed, permanently configured (e.g., hardwired), or temporarily configured (e.g., programmed) to operate in a certain manner or to perform certain operations described herein. As used herein, "hardware-implemented module" refers to a hardware module. Considering embodiments in which hardware modules are temporarily configured (e.g., programmed), each of the hardware modules need not be configured or instantiated at any one instance in time. For example, where a hardware module comprises a general-purpose processor configured by software to become a special-purpose processor, the general-purpose processor may be configured as respectively different special-purpose processors (e.g., comprising different hardware modules) at different times. Software (e.g., a software module) may accordingly configure one or more processors, for example, to constitute a particular hardware module at one instance of time and to constitute a different hardware module at a different instance of time.

Hardware modules can provide information to, and receive information from, other hardware modules. Accordingly, the described hardware modules may be regarded as being communicatively coupled. Where multiple hardware modules exist contemporaneously, communications may be achieved through signal transmission (e.g., over appropriate circuits and buses) between or among two or more of the hardware modules. In embodiments in which multiple hardware modules are configured or instantiated at different times, communications between such hardware modules may be achieved, for example, through the storage and retrieval of information in memory structures to which the multiple hardware modules have access. For example, one hardware module may perform an operation and store the output of that operation in a memory device to which it is communicatively coupled. A further hardware module may then, at a later time, access the memory device to retrieve and process the stored output. Hardware modules may also initiate communications with input or output devices, and can operate on a resource (e.g., a collection of information).

The various operations of example methods described herein may be performed, at least partially, by one or more processors that are temporarily configured (e.g., by software) or permanently configured to perform the relevant operations. Whether temporarily or permanently configured, such processors may constitute processor-implemented modules that operate to perform one or more operations or functions described herein. As used herein, "processor-implemented module" refers to a hardware module implemented using one or more processors.

Similarly, the methods described herein may be at least partially processor-implemented, a processor being an example of hardware. For example, at least some of the operations of a method may be performed by one or more processors or processor-implemented modules. As used herein, "processor-implemented module" refers to a hardware module in which the hardware includes one or more processors. Moreover, the one or more processors may also operate to support performance of the relevant operations in a "cloud computing" environment or as a "software as a service" (SaaS). For example, at least some of the operations may be performed by a group of computers (as examples of machines including processors), with these operations being accessible via a network (e.g., the Internet) and via one or more appropriate interfaces (e.g., an application program interface (API)).

The performance of certain operations may be distributed among the one or more processors, not only residing within a single machine, but deployed across a number of machines. In some example embodiments, the one or more processors or processor-implemented modules may be located in a single geographic location (e.g., within a home environment, an office environment, or a server farm). In other example embodiments, the one or more processors or processor-implemented modules may be distributed across a number of geographic locations.

Some portions of the subject matter discussed herein may be presented in terms of algorithms or symbolic representations of operations on data stored as bits or binary digital signals within a machine memory (e.g., a computer memory). Such algorithms or symbolic representations are examples of techniques used by those of ordinary skill in the data processing arts to convey the substance of their work to others skilled in the art. As used herein, an "algorithm" is a self-consistent sequence of operations or similar processing leading to a desired result. In this context, algorithms and operations involve physical manipulation of physical quantities. Typically, but not necessarily, such quantities may take the form of electrical, magnetic, or optical signals capable of being stored, accessed, transferred, combined, compared, or otherwise manipulated by a machine. It is convenient at times, principally for reasons of common usage, to refer to such signals using words such as "data," "content," "bits," "values," "elements," "symbols," "characters," "terms," "numbers," "numerals," or the like. These words, however, are merely convenient labels and are to be associated with appropriate physical quantities.

Unless specifically stated otherwise, discussions herein using words such as processing," "computing," "calculating," "determining," "presenting," "displaying," or the like may refer to actions or processes of a machine (e.g., a computer) that manipulates or transforms data represented as physical (e.g., electronic, magnetic, or optical) quantities within one or more memories (e.g., volatile memory, nonvolatile memory, or any suitable combination thereof), registers, or other machine components that receive, store, transmit, or display information. Furthermore, unless specifically stated otherwise, the terms "a" or "an" are herein used, as is common in patent documents, to include one or more than one instance. Finally, as used herein, the conjunction "or" refers to a non exclusive "or," unless specifically stated otherwise.

What is claimed is:

1. A system, comprising:
one or more processors; and
a memory storing instructions which, when executed by the one or more processors, cause the system to perform operations comprising:
receiving an image depicting a physical space and an indication of one or more physical dimensions of the physical space;
receiving one or more vectors that define a boundary of the physical space, a shape that encloses the physical space, or both;
receiving an indication of a list of two or more items available from a networked marketplace, the list of two or more items including at least a first item and a second item available from the networked marketplace, wherein each item in the list has a respective size comprising physical dimensions that are within a threshold of the one or more physical dimensions of the physical space;
generating a plurality of composite images by:
generating, for each item in the list of two or more items, a respective composite image that overlays a first image of the item within the image depicting the physical space, wherein the respective composite image is scaled according to the one or more physical dimensions of the physical space and one or more physical dimensions of the item and based at least in part on receiving the one or more vectors that define the boundary of the physical space, the shape that encloses the physical space, or both; and
displaying, on a user device, the list of two or more items simultaneously with the plurality of composite images.

2. The system of claim 1, wherein the instructions to receive the indication, when executed by the one or more processors, further cause the system to perform operations comprising:
receiving, from the user device, a query for one or more items available at the networked marketplace.

3. The system of claim 1, wherein the instructions, when executed by the one or more processors, cause the system to perform operations comprising:
generating the plurality of composite images based at least in part on receiving the indication.

4. The system of claim 1, wherein the instructions, when executed by the one or more processors, cause the system to perform operations comprising:
receiving, from the user device, a first request to change one or more of a scale, a position, or an orientation of a first composite image of the plurality of composite images, wherein the first composite image is of the first item; and
adjusting one or more of the scale, the position, or the orientation of the first composite image based at least in part on receiving the first request, wherein displaying the plurality of composite images is based at least in part on adjusting one or more of the scale, the position, and the orientation of the first composite image.

5. The system of claim 4, wherein the instructions, when executed by the one or more processors, cause the system to perform operations comprising:
receiving, from the user device, a second request to change the first image of the first item based at least in part on displaying the plurality of composite images;
changing the first image of the first item based at least in part on receiving the second request; and
transmitting, to the user device, an additional composite image that overlays a third image of a third item within the image depicting the physical space based at least in part on changing the first image of the first item.

6. The system of claim 5, wherein the second request comprises a request to change a light source of the first image of the first item.

7. The system of claim 1, wherein the instructions to display the list of two or more items simultaneously with the plurality of composite images, when executed by the one or more processors, further cause the system to perform operations comprising:
transmitting, to the user device, the list of two or more items and the plurality of composite images.

8. A method, comprising:
receiving, by one or more processors, an image depicting a physical space and an indication of one or more physical dimensions of the physical space;
receiving, by the one or more processors, one or more vectors that define a boundary of the physical space, a shape that encloses the physical space, or both;
receiving, by the one or more processors, an indication of a list of two or more items available from a networked marketplace, the list of two or more items including at least a first item and a second item available from the networked marketplace, wherein each item in the list has a respective size comprising physical dimensions that are within a threshold of the one or more physical dimensions of the physical space;
generating a plurality of composite images by:
generating, for each item in the list of two or more items, a respective composite image that overlays a first image of the item within the image depicting the physical space, wherein the respective composite image is scaled according to the one or more physical dimensions of the physical space and one or more physical dimensions of the item and based at least in part on receiving the one or more vectors that define the boundary of the physical space, the shape that encloses the physical space, or both; and displaying, on a user device, the list of two or more items simultaneously with the plurality of composite images.

9. The method of claim 8, wherein receiving the indication further comprises:
receiving, from the user device, a query for one or more items available at the networked marketplace.

10. The method of claim 8, further comprising:
generating the plurality of composite images based at least in part on receiving the indication.

11. The method of claim 8, further comprising:
receiving, from the user device, a first request to change one or more of a scale, a position, or an orientation of a first composite image of the plurality of composite images, wherein the first composite image is of the first item; and
adjusting one or more of the scale, the position, or the orientation of the first composite image based at least in part on receiving the first request, wherein displaying the plurality of composite images is based at least in part on adjusting one or more of the scale, the position, and the orientation of the first composite image.

12. The method of claim 11, further comprising:
receiving, from the user device, a second request to change the first image of the first item based at least in part on displaying the plurality of composite images;
changing the first image of the first item based at least in part on receiving the second request; and
transmitting, to the user device, an additional composite image that overlays a third image of a third item within the image depicting the physical space based at least in part on changing the first image of the first item.

13. The method of claim 12, wherein the second request comprises a request to change a light source of the first image of the first item.

14. The method of claim 8, further comprising:
transmitting, to the user device, the list of two or more items and the plurality of composite images.

15. A non-transitory computer-readable medium storing executable instructions which, when executed by one or more processors of a server, cause the server to perform operations comprising:
receiving an image depicting a physical space and an indication of one or more physical dimensions of the physical space;
receiving one or more vectors that define a boundary of the physical space, a shape that encloses the physical space, or both;
receiving an indication of a list of two or more items available from a networked marketplace, the list of two or more items including at least a first item and a second item available from the networked marketplace, wherein each item in the list has a respective size comprising physical dimensions that are within a threshold of the one or more physical dimensions of the physical space;
generating a plurality of composite images by:
generating, for each item in the list of two or more items, a respective composite image that overlays a first image of the item within the image depicting the physical space, wherein the respective composite image is scaled according to the one or more physical dimensions of the physical space and one or more physical dimensions of the item and based at least in part on receiving the one or more vectors that define the boundary of the physical space, the shape that encloses the physical space, or both; and
displaying, on a user device, the list of two or more items simultaneously with the plurality of composite images.

16. The non-transitory computer-readable medium of claim 15, wherein the instructions to receive the indication, when executed by the one or more processors, further cause the server to perform operations comprising:
receiving, from the user device, a query for one or more items available at the networked marketplace.

17. The non-transitory computer-readable medium of claim 15, wherein the instructions which, when executed by the one or more processors, cause the server to perform operations comprising:
generating the plurality of composite images based at least in part on receiving the indication.

18. The non-transitory computer-readable medium of claim 15, wherein the instructions which, when executed by the one or more processors, cause the server to perform operations comprising:
receiving, from the user device, a first request to change one or more of a scale, a position, or an orientation of a first composite image of the plurality of composite images, wherein the first composite image is of the first item; and
adjusting one or more of the scale, the position, or the orientation of the first composite image based at least in part on receiving the first request, wherein displaying the plurality of composite images is based at least in part on adjusting one or more of the scale, the position, and the orientation of the first composite image.

19. The non-transitory computer-readable medium of claim 18, wherein the instructions which, when executed by the one or more processors, cause the server to perform operations comprising:
receiving, from the user device, a second request to change the first image of the first item based at least in part on displaying the plurality of composite images;
changing the first image of the first item based at least in part on receiving the second request; and
transmitting, to the user device, an additional composite image that overlays a third image of a third item within the image depicting the physical space based at least in part on changing the first image of the first item.

20. The non-transitory computer-readable medium of claim 15, wherein the instructions to display the list of two or more items simultaneously with the plurality of composite images, when executed by the one or more processors, further cause the server to perform operations comprising:
transmitting, to the user device, the list of two or more items and the plurality of composite images.

* * * * *